United States Patent
Zhang et al.

(10) Patent No.: US 10,809,063 B2
(45) Date of Patent: Oct. 20, 2020

(54) YAW RATE SENSOR AND METHOD FOR OPERATING A YAW RATE SENSOR

(71) Applicant: Robert Bosch GmbH, Stuttgart (DE)

(72) Inventors: Guangzhao Zhang, Munich (DE); Andrea Visconti, Munich (DE); Francesco Diazzi, Munich (DE); Ruslan Khalilyulin, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/486,759

(22) PCT Filed: Mar. 1, 2018

(86) PCT No.: PCT/EP2018/055121
§ 371 (c)(1),
(2) Date: Aug. 16, 2019

(87) PCT Pub. No.: WO2018/184771
PCT Pub. Date: Oct. 11, 2018

(65) Prior Publication Data
US 2019/0383613 A1    Dec. 19, 2019

(30) Foreign Application Priority Data
Apr. 7, 2017 (DE) .......................... 10 2017 205 984

(51) Int. Cl.
*G01C 19/58* (2006.01)
*G01C 19/10* (2006.01)
*G01C 19/5712* (2012.01)
*G01C 19/5776* (2012.01)

(52) U.S. Cl.
CPC ............. *G01C 19/58* (2013.01); *G01C 19/10* (2013.01); *G01C 19/5712* (2013.01); *G01C 19/5776* (2013.01)

(58) Field of Classification Search
CPC .... G01C 19/58; G01C 19/10; G01C 19/5712; G01C 19/5776
See application file for complete search history.

(56) References Cited

U.S. PATENT DOCUMENTS

| | | | | |
|---|---|---|---|---|
| 5,889,208 A | * | 3/1999 | Nose | G01C 19/5656 73/504.12 |
| 7,551,017 B2 | * | 6/2009 | Felder | H03F 3/34 327/333 |
| 10,393,552 B1 | * | 8/2019 | Cazzaniga | G01D 3/02 |

(Continued)

OTHER PUBLICATIONS

International Search Report for PCT/EP2018/055121, dated May 30, 2018.

*Primary Examiner* — Helen C Kwok
(74) *Attorney, Agent, or Firm* — Norton Rose Fulbright US LLP

(57) ABSTRACT

A yaw rate sensor having a drive for exciting an oscillation of an oscillatory mass, the drive having at least one drive amplifier circuit, and having a detector for detecting a displacement of the oscillatory mass, the detector having at least one detector amplifier circuit, either a low bias current being able to be set for operating the drive amplifier circuit and/or the detector amplifier circuit in an energy-saver mode, or a higher bias current being able to be set for operating the drive amplifier circuit and/or the detector amplifier circuit in a normal mode.

9 Claims, 1 Drawing Sheet

(56) References Cited

U.S. PATENT DOCUMENTS

| | | | | |
|---|---|---|---|---|
| 2008/0178672 A1* | 7/2008 | Kanai | ............... | H03B 5/36 |
| | | | | 73/504.12 |
| 2009/0084180 A1* | 4/2009 | Yoshida | ............ | G01F 1/8422 |
| | | | | 73/504.02 |
| 2010/0071466 A1* | 3/2010 | Kanai | ............. | G01C 19/56 |
| | | | | 73/504.02 |
| 2011/0115501 A1* | 5/2011 | He | ............. | G01C 19/5726 |
| | | | | 324/661 |
| 2011/0121907 A1* | 5/2011 | Kanai | ............ | G01C 19/5776 |
| | | | | 331/65 |
| 2011/0140769 A1* | 6/2011 | Visconti | ............ | G05F 3/30 |
| | | | | 327/543 |
| 2011/0310659 A1* | 12/2011 | Seol | ............. | H03B 5/1228 |
| | | | | 365/149 |
| 2012/0062197 A1* | 3/2012 | Luders | ............ | G05F 1/563 |
| | | | | 323/282 |
| 2014/0260713 A1* | 9/2014 | Shaeffer | ............ | H03L 7/093 |
| | | | | 74/5.4 |
| 2015/0122022 A1* | 5/2015 | Maki | ............ | G01C 19/5614 |
| | | | | 73/504.16 |
| 2015/0160012 A1* | 6/2015 | Ii | ............ | G01C 19/5614 |
| | | | | 73/504.12 |
| 2017/0153659 A1* | 6/2017 | Quelen | ............ | G05F 3/267 |
| 2017/0328712 A1* | 11/2017 | Collin | ............ | H03D 7/00 |
| 2018/0143020 A1* | 5/2018 | Hatakeyama | ...... | G01C 19/5776 |
| 2019/0145773 A1* | 5/2019 | Collin | ............ | G01C 19/5776 |
| | | | | 73/504.12 |

* cited by examiner

YAW RATE SENSOR AND METHOD FOR OPERATING A YAW RATE SENSOR

The present invention relates to a yaw rate sensor, as well as a method for operating a yaw rate sensor.

BACKGROUND INFORMATION

Yaw rate sensors typically include a drive for exciting an oscillation of an oscillatory mass, the drive having at least one drive amplifier circuit. The displacement of the oscillatory mass is able to be detected via a detector. The detector usually has at least one detector amplifier circuit. In addition, as a rule, a reference-current generator is provided to generate a reference current for the drive amplifier circuit and/or the detector amplifier circuit in the yaw rate sensor. For example, the yaw rate sensors may be implemented as micro-electro-mechanical systems (MEMS).

Yaw rate sensors of this type are typically used in mobile terminals which are battery-powered, and therefore are able to provide only limited energy reserves for operating such yaw rate sensors. In order to reduce the energy consumption of such yaw rate sensors, it is conventional to switch the yaw rate sensors on and off periodically. In the ON state of the yaw rate sensor, a measurement may be performed. The yaw rate sensor is thereupon transferred into its OFF state. In this way, a low energy consumption may be set, which permits the operation of such a yaw rate sensor in a mobile terminal.

However, it has proven to be disadvantageous that upon switching the yaw rate sensor on, that is, in switching over from the OFF state to the ON state, a certain start-up time must first elapse before a sufficiently accurate measurement is possible. For example, this start-up time is due to the fact that the oscillatory mass cannot be set into the intended oscillation as quickly as desired.

SUMMARY

An object of the present invention is to permit the operation of a yaw rate sensor in a mobile terminal with a reduced start-up time.

An example yaw rate sensor of the present invention and an example method of the present invention for operating a yaw rate sensor may have the advantage that either a low bias current is able to be set for operating the drive amplifier circuit and/or the detector amplifier circuit in an energy-saver mode, or a higher bias current is able to be set for operating the drive amplifier circuit and/or the detector amplifier circuit in a normal mode. Because of the lower bias current, the drive amplifier circuit and/or the detector amplifier circuit has/have a lower bandwidth and a higher noise level in the energy-saver mode. Since the currents in the individual legs of the amplifier circuits are reduced in the same manner via the bias current, the pole positions and zero points of the respective amplifier circuit change only insignificantly in the energy-saver mode. The changeover from the energy-saver mode to the normal mode therefore has only a slight influence on the stability of the amplifier circuit. Thus, the drive amplifier circuit and/or the detector amplifier circuit is/are active with reduced performance in the energy-saver mode. A trade-off takes place between the current consumption and the performance of the yaw rate sensor. Upon switching over to the normal mode, the amplifier circuits are able to be transferred comparatively quickly into their normal operating state. It is therefore not necessary to wait for a long start-up time of the yaw rate sensor.

Exemplary embodiments of the present invention are shown in the figures and explained in greater detail below.

According to one advantageous embodiment of the present invention, the yaw rate sensor includes a reference-current generator to generate a reference current for the drive amplifier circuit and/or the detector amplifier circuit, the reference-current generator having a first field-effect transistor, the first field-effect transistor having a first channel width which is alterable in order to adjust the bias current. The first channel width is understood to be the extension of the current-carrying channel of the first field-effect transistor perpendicular to the current direction. The channel width of the first field-effect transistor is proportional to the reference current carried by the first field-effect transistor. The reference current carried by the first field-effect transistor may be adjusted by adjusting the first channel width. In the drive amplifier circuit and/or the detector amplifier circuit, the bias current of the respective amplifier circuit may be derived from the reference current. Thus, the bias current may be set via the reference current provided by the reference-current generator. Preferably, the first field-effect transistor takes the form of a MOSFET (metal-oxide semiconductor field-effect transistor) or a FinFET (fin field-effect transistor). Alternatively, the first field-effect transistor may be implemented as a JFET (junction field-effect transistor). The first field-effect transistor may be an n-channel field-effect transistor or a p-channel field-effect transistor.

In this connection, it may be advantageous if the first field-effect transistor has a plurality of first gate fingers, at least one first gate finger being switchable selectively on or off to adjust the bias current. The first channel width of the first field-effect transistor is dependent on the width of the first gate electrode of the first field-effect transistor. In the case of a first field-effect transistor with a first gate electrode that has a plurality of first gate fingers, at least one first gate finger is therefore able to be switched on or off, so that the effective width of the first gate electrode may be adjusted by switching the first gate finger on or off. Preferably, the first gate finger, switchable on or off, is connected to a switching element, e.g., a field-effect transistor.

A further advantageous refinement provides that the reference-current generator has a plurality of parallel-connected first transistors, at least one of the first transistors being switchable selectively on or off in order to adjust the reference current. The reference current may be increased by switching on a first transistor in parallel, and decreased by switching off the first transistor. In the case of an increased reference current, an increased bias current is obtained in the drive amplifier circuit and/or in the detector amplifier circuit, and in the case of a decreased reference current, a decreased bias current results in the drive amplifier circuit and/or in the detector amplifier circuit. The first transistors may be bipolar transistors or field-effect transistors.

According to one advantageous development of the present invention, the drive amplifier circuit and/or the detector amplifier circuit has/have a second field-effect transistor, the second field-effect transistor having a channel width which is alterable in order to adjust the bias current. The second channel width is understood to be the extension of the current-carrying channel of the second field-effect transistor perpendicular to the current direction. The second channel width of the second field-effect transistor is proportional to the reference current carried by the second field-effect transistor. The reference current carried by the second field-effect transistor may therefore be adjusted by adjusting the second channel width. Preferably, the reference current carried by the second transistor is the input current of a current mirror and the bias current is the output current of the current mirror, so that the bias current may be reduced by increasing the channel width of the second field-effect transistor. On the other hand, by decreasing the channel width of the second field-effect transistor, the bias current may be increased. Preferably, the second field-effect transistor is implemented as a MOSFET (metal-oxide semiconductor field-effect transistor) or as a FinFET (fin field-effect transistor). Alternatively, the second field-effect transistor may take the form of a JFET (junction field-effect transistor). The second field-effect transistor may be an n-channel field-effect transistor or a p-channel field-effect transistor.

In this connection, it is advantageous if the second field-effect transistor has a plurality of second gate fingers, at least one second gate finger being switchable selectively on or off in order to adjust the bias current. The second channel width of the second field-effect transistor is dependent on the width of the gate electrode of the second field-effect transistor. In the case of a second field-effect transistor with a second gate electrode that has a plurality of second gate fingers, at least one second gate finger is therefore able to be switched on or off, so that the effective width of the second gate electrode may be adjusted by switching the second gate finger on or off. Preferably, the second gate finger, switchable on or off, is connected to a switching element, e.g., a field-effect transistor. If the reference current carried by the second transistor is the input current of a current mirror and the bias current is the output current of the current mirror, the bias current may be reduced by switching one gate finger of the second field-effect transistor on. On the other hand, the bias current may be increased by switching one gate finger of the second field-effect transistor off.

According to a further advantageous refinement of the present invention, the drive amplifier circuit and/or the detector amplifier circuit has/have a plurality of parallel-connected second transistors, at least one of the second transistors being switchable selectively on or off in order to adjust the bias current. If the reference current carried by the second transistor is the input current of a current mirror and the bias current is the output current of the current mirror, the bias current may be decreased by switching on a second transistor in parallel, and increased by switching a second transistor off. The second transistors may be bipolar transistors or field-effect transistors.

The yaw rate sensor according to the present invention is employed preferably in a mobile terminal which has an energy store, especially a battery, to supply the yaw rate sensor with electrical energy.

In the method according to the present invention, the switchover between the energy-saver mode and the normal mode may be accomplished via a control command. The control command may be supplied to the yaw rate sensor by a control unit of a mobile terminal. The control command may be triggered via an input by a user of the mobile terminal. Alternatively, it is possible for the control unit to generate the control command, especially automatically, as a function of a state variable of the mobile terminal, e.g., as a function of a state of charge of the energy store or an operating state of a functional unit of the terminal.

The advantageous features explained in connection with the yaw rate sensor may likewise be applied to the example method according to the present invention.

Further particulars and advantages of the present invention are explained in greater detail below on the basis of the exemplary embodiments illustrated in the figures.

DETAILED DESCRIPTION OF EXAMPLE EMBODIMENTS

Figure 1:
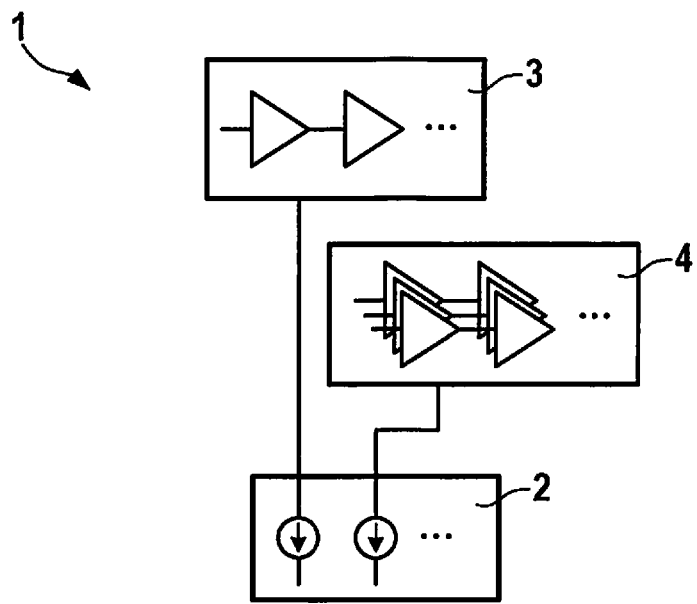
FIG. 1 shows the main electrical loads of a yaw rate sensor according to one exemplary embodiment of the present invention in a block diagram.

FIG. 1 shows in a block diagram, the main electrical loads of a yaw rate sensor 1, taking the form of a gyroscope, according to one exemplary embodiment of the present invention. Yaw rate sensor 1 is a MEMS yaw rate sensor. Yaw rate sensor 1 has an oscillatory mass, not shown in the block diagram, which is set into oscillation and kept in oscillation by a drive of the yaw rate sensor. The displacement of the oscillatory mass is measured by a detector of the yaw rate sensor to determine the yaw rate. The detector supplies an output signal which is a function of the yaw rate to which the yaw rate sensor is exposed. The main electrical loads of yaw rate sensor 1 are drive amplifier circuits 3 provided in the drive as well as detector amplifier circuits 4 provided in the detector. For example, drive amplifier circuits 3 and detector amplifier circuits 4 may be implemented as differential amplifiers. To operate, such differential amplifiers require an essentially constant bias current 101, 102, 103, which goes hand in hand with an essentially constant energy consumption.

As further explained below, this bias current 101, 102, 103 may be provided via one or more reference-current generators 2 as well as via current mirrors disposed in drive amplifier circuits 3 and/or detector amplifier circuits 4. In general, improved performance of drive amplifier circuit 3 and/or of detector amplifier circuit 4, especially higher bandwidth and/or less noise, may be achieved with a higher bias current 101, 102, 103. However, the price for this performance is a constant, not insignificant energy consumption.

In the case of yaw rate sensor 1 according to the exemplary embodiment, special measures have been taken to reduce energy consumption, and nevertheless to permit the operation of yaw rate sensor 1 with sufficient performance in a mobile terminal.

Such mobile terminals often have only one energy store in the form of a battery for supplying yaw rate sensor 1. According to the present invention, either a low bias current 101, 102, 103 is able to be set for operating drive amplifier circuits 3 and/or detector amplifier circuits 4 in an energy-saver mode, or a higher bias current 101, 102, 103 is able to be set for operating drive amplifier circuits 3 and/or detector amplifier circuits 4 in a normal mode. Because of lower bias current 101, 102, 103, drive amplifier circuit 3 and/or detector amplifier circuit 4 has/have a lower bandwidth and greater noise in the energy-saver mode. However, the changeover from the energy-saver mode to the normal mode has only a slight influence on the stability of drive amplifier circuit 3 and/or detector amplifier circuit 4. Upon switching over to the normal mode, drive amplifier circuits 3 and/or detector amplifier circuits 4 are able to be transferred quickly into their normal operating state. It is therefore not necessary to wait for a long start-up time of yaw rate sensor 1.

Figure 2:
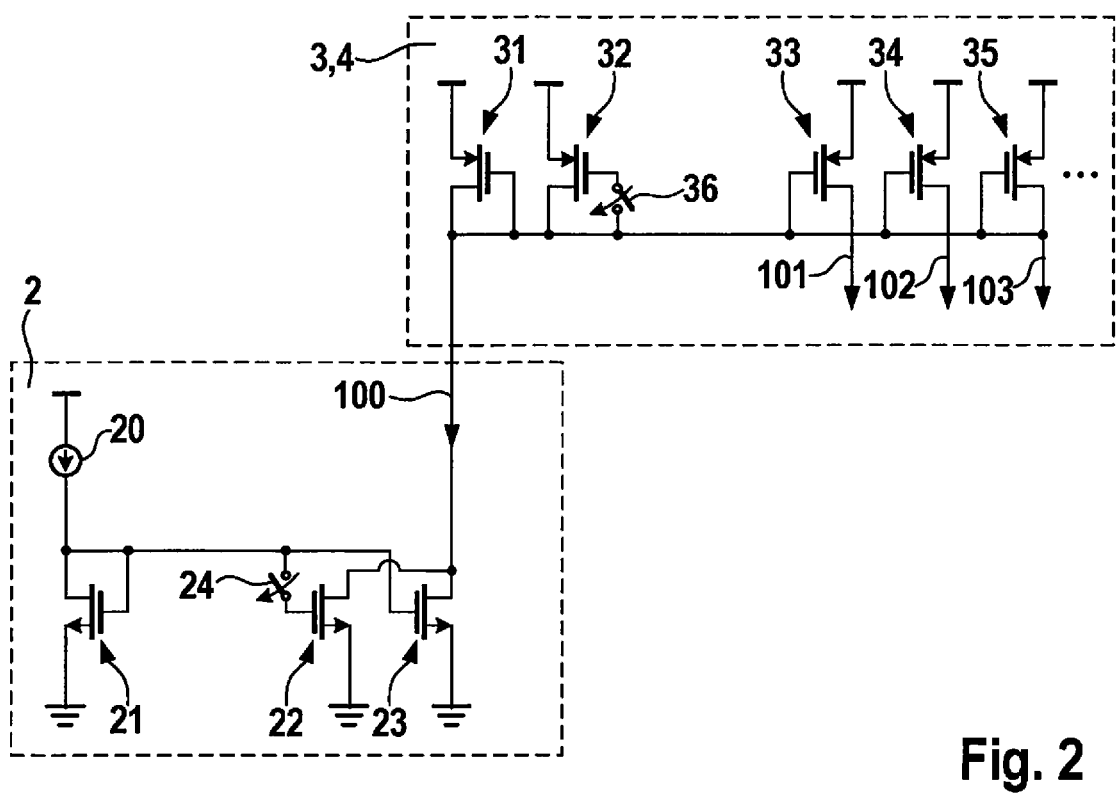
FIG. 2 shows a schematic circuit diagram of a reference-current generator and a drive amplifier circuit and/or detector amplifier circuit of a yaw rate sensor according to one exemplary embodiment of the present invention.

FIG. 2 shows a simplified circuit diagram of a portion of a yaw rate sensor 1 according to one exemplary embodiment of the invention. Shown are a reference-current generator 2 and an amplifier circuit 3, 4 which may take the form of a drive amplifier circuit and/or detector amplifier circuit. A reference current 100 is generated via the reference-current generator and provided to amplifier circuit 3, 4.

Reference-current generator 2 according to the exemplary embodiment has a current mirror. The current mirror includes a current source 20 and a plurality of transistors 21, 22, 23 in the form of field-effect transistors connected to the current source. In the depiction in FIG. 2, a first field-effect transistor is represented by symbols 22 and 23 and a second field-effect transistor is represented by symbol 21. First field-effect transistor 22, 23 has a plurality of gate fingers, symbol 22 denoting a first gate finger and symbol 23 denoting a second gate finger. Differing from this, first field-effect transistor 22, 23 may have additional gate fingers. As a further alternative, instead of one first field-effect transistor 22, 23, a plurality of parallel-connected transistors may be provided.

First field-effect transistor 22, 23 has a first channel width which is alterable in order to adjust bias current 101, 102, 103. According to the exemplary embodiment, this adjustability of the channel width is made possible because first gate finger 22 of the first field-effect transistor is switchable selectively on or off. To that end, a switch 24 is provided in the connection path between current source 20 and the gate electrode of first gate finger 22. Switch 24 may be controlled via a control unit of the mobile terminal. Switch 24 may be implemented as a transistor, e.g., as a field-effect transistor. The effective width of the first gate electrode is adjusted by switching first gate finger 22 on or off. When switch 24 is closed, first gate finger 22 is switched on. The channel width of first field-effect transistor 22, 23 is increased. The field-effect transistor is thus able to provide an increased reference current 100. This increased reference current 100 is mirrored via the current mirror of amplifier circuit 3, 4 to bias currents 101, 102, 103 of the amplifier circuit. This state represents the normal mode of yaw rate sensor 1. If switch 24 is opened, then gate finger 22 is switched off. The channel width of first field-effect transistor 22, 23 is reduced. Reference current 100 is decreased. Decreased reference current 100 is mirrored via the current mirror of amplifier circuit 3, 4 to bias currents 101, 102, 103. This state represents the energy-saver mode of yaw rate sensor 1.

In the case of yaw rate sensor 1 according to the exemplary embodiment, bias currents 101, 102, 103 may be influenced alternatively or additionally by a second switch 36 which is disposed in amplifier circuit 3, 4. Amplifier circuit 3, 4 has a current mirror, into which reference current 100 is fed. The current mirror has a plurality of mirror transistors, which provide individual bias currents 101, 102, 103. In addition, a second field-effect transistor 31, 32 is provided, which has a plurality of gate fingers. A first gate finger 31 and a second gate finger 32 are shown in the representation in FIG. 2. Differing from that, the second field-effect transistor may have further gate fingers. In addition, alternatively or instead of field-effect transistor 31, 32, a parallel connection of a plurality of transistors, particularly field-effect transistors, may be provided. First gate finger 32 is switchable selectively on or off via switch 36. The effective width of the second gate electrode of the second field-effect transistor is adjusted by switching second gate finger 32 on or off. When switch 36 is closed, first gate finger 32 is switched on. The channel width of second field-effect transistor 31, 32 is increased. As a result, mirrored bias currents 101, 102, 103 decrease. This state represents the energy-saver mode of yaw rate sensor 1. If second switch 36 is opened, then second gate finger 32 is switched off. The channel width of second field-effect transistor 31, 32 is reduced. Mirrored bias currents 101, 102, 103 increase. This state represents the normal mode of yaw rate sensor 1.

Yaw rate sensors 1 described above have a drive for exciting an oscillation of an oscillatory mass, the drive including at least one drive amplifier circuit 3. These yaw rate sensors 1 also have a detector for detecting a displacement of the oscillatory mass, the detector including at least one detector amplifier circuit 4. To enable yaw rate sensors 1 to operate in a mobile terminal with a reduced start-up time, either a low bias current 101, 102, 103 is able to be set for operating drive amplifier circuit 3 and/or detector amplifier circuit 4 in an energy-saver mode, or a higher bias current 101, 102, 103 is able to be set for operating drive amplifier circuit 3 and/or detector amplifier circuit 4 in a normal mode.

In the description above, the use of a definite or indefinite article together with a noun is also intended to include the plural of the noun, unless otherwise stated. The terms "first" and "second" in the description herein are intended to permit differentiation of similar elements from one another, and describe no specific sequence of these elements. In addition, identical elements are identified hereinafter with identical reference numerals.

What is claimed is:

1. A yaw rate sensor, comprising:
a drive configured to excite an oscillation of an oscillatory mass, the drive having at least one drive amplifier circuit;
a detector configured to detect a displacement of the oscillatory mass, the detector having at least one detector amplifier circuit;
wherein either (i) a low bias current is able to be set for operating the drive amplifier circuit and/or the detector amplifier circuit in an energy-saver mode, or (ii) a higher bias current is able to be set for operating the drive amplifier circuit and/or the detector amplifier circuit in a normal mode,
wherein the yaw rate sensor includes a reference-current generator configured to generate a reference current for the drive amplifier circuit and/or the detector amplifier circuit, the reference-current generator having a first field-effect transistor, the first field-effect transistor being a MOSFET, the first field-effect transistor having a first channel width which is alterable in order to adjust the low and/or higher bias current.

2. The yaw rate sensor as recited in claim 1, wherein the first field-effect transistor has a plurality of first gate fingers, at least one first gate finger being switchable selectively on or off in order to adjust the low and/or higher bias current.

3. The yaw rate sensor as recited claim 1, wherein the reference-current generator has a plurality of parallel-connected first transistors, at least one of the first transistors being switchable selectively on or off in order to adjust the low and/or higher bias current.

4. The yaw rate sensor as recited in claim 1, wherein the drive amplifier circuit and/or the detector amplifier circuit has/have a second field-effect transistor, the second field-effect transistor being a MOSFET, the second field-effect transistor having a second channel width which is alterable in order to adjust the low and/or higher bias current.

5. The yaw rate sensor as recited in claim 4, wherein the second field-effect transistor has a plurality of second gate fingers, at least one second gate finger being switchable selectively on or off in order to adjust the low and/or higher bias current.

6. The yaw rate sensor as recited in claim 1, wherein the drive amplifier circuit and/or the detector amplifier circuit has/have a plurality of parallel-connected second transistors, at least one of the second transistors being switchable selectively on or off in order to adjust the low and/or higher bias current.

7. A mobile terminal, comprising:
a yaw rate sensor, the yaw rate sensor including:
a drive configured to excite an oscillation of an oscillatory mass, the drive having at least one drive amplifier circuit,
a detector configured to detect a displacement of the oscillatory mass, the detector having at least one detector amplifier circuit,
wherein either (i) a low bias current is able to be set for operating the drive amplifier circuit and/or the detector amplifier circuit in an energy-saver mode, or (ii) a higher bias current is able to be set for operating the drive amplifier circuit and/or the detector amplifier circuit in a normal mode; and
an energy store to supply the yaw rate sensor with electrical energy
wherein the yaw rate sensor includes a reference-current generator configured to generate a reference current for the drive amplifier circuit and/or the detector amplifier circuit, the reference-current generator having a first field-effect transistor, the first field-effect transistor being a MOSFET, the first field-effect transistor having a first channel width which is alterable in order to adjust the low and/or higher bias current.

8. A method for operating a yaw rate sensor having a drive configured to excite an oscillation of an oscillatory mass, the drive having at least one drive amplifier circuit, and having a detector configured to detect a displacement of the oscillatory mass, the detector having at least one detector amplifier circuit, the method comprising:
either setting a low bias current for operating the drive amplifier circuit and/or the detector amplifier circuit in an energy-saver mode, or setting a higher bias current for operating the drive amplifier circuit and/or the detector amplifier circuit in a normal mode,
wherein the yaw rate sensor includes a reference-current generator configured to generate a reference current for the drive amplifier circuit and/or the detector amplifier circuit, the reference-current generator having a first field-effect transistor, the first field-effect transistor being a MOSFET, the first field-effect transistor having a first channel width which is alterable in order to adjust the low and/or higher bias current.

9. The method as recited in claim 8, wherein a switchover between the energy-saver mode and the normal mode is controlled via a control command.

\* \* \* \* \*